Sperry & Hopson.
Churn Dasher.
Nº 88,226.            Patented Mar. 23, 1869.

Witnesses;
J. R. Dale
Geo. W. Miatt

Inventors;
Orville Sperry.
John W. Hopson.
By J. Fraser & Co.
Attys.

ORVILLE SPERRY AND JOHN W. HOPSON, OF HARTFIELD, NEW YORK.

Letters Patent No. 88,226, dated March 23, 1869.

IMPROVEMENT IN CHURN-DASHER.

The Schedule referred to in these Letters Patent and making part of the same.

*To all whom it may concern:*

Be it known that we, ORVILLE SPERRY and JOHN W. HOPSON, of Hartfield, in the county of Chautauqua, and State of New York, have invented certain new and useful Improvements in Churn-Dashers; and we do hereby declare that the following is a full and exact description thereof, reference being had to the accompanying drawings, making part of this specification, in which—

Figure 2 is a perspective view of a rotary dasher with our improvement attached.

Like letters of reference indicate corresponding parts in both figures.

Figure 1:
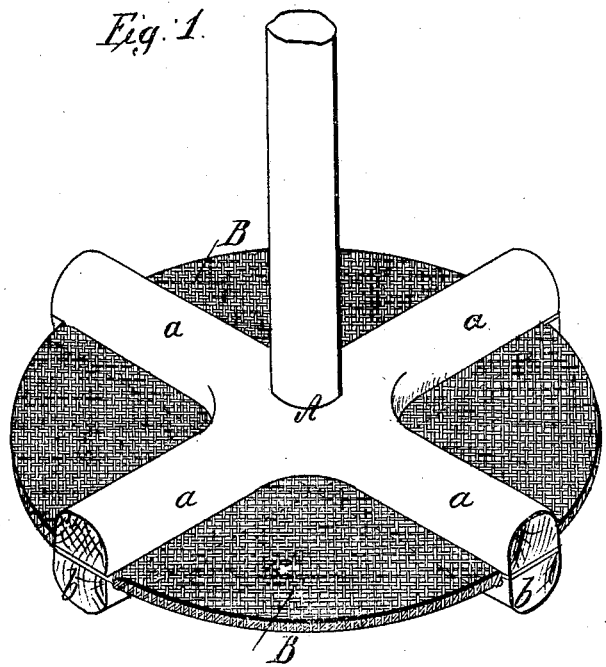
Figure 1 is a perspective view of lower portion of a vertical churn-dasher having our improvement attached.

The principal object of our invention is to provide a device for breaking up the cream-flakes, or dried cream, which forms when the cream is rising; and consists in attaching to the wings, or arms of a churn-dasher, a metal sieve, which is clamped between the divided heads of the dasher, the object to be hereinafter more fully explained.

In the drawings, (fig. 1)—

A represents the lower portion of a churn-dasher, with wings, or arms divided longitudinally through the centre, $a\ a$ representing the upper, and $b\ b$, the lower portions.

Between these divided arms, we place a sieve, B, made of any suitable wire, or perforated metal, if preferred, and of any desirable form to conform to the shape of the churn.

The operation of churning is greatly facilitated by the use of this wire, or perforated-metal sieve, to cut through, break up, and convert into butter the "cream-flakes," or "white-caps," or, more properly speaking, dried cream, always found in churning, which does not come to butter unless broken up, and which greatly obstructs the quick making of butter, and necessitates the use of a cream-pump, or repeated washing of the butter by hand.

It also causes considerable loss, as this dried cream is usually thrown away with the buttermilk, while, by our process, it is cut through and through by the action of the dasher, dissolved, and works into butter with the rest of the cream.

As a natural consequence, by our method, butter is made quicker, and in twenty pounds' churning there will be a gain of at least a pound of butter. It does not spatter the cream as the old dasher does. It supplies the place of an atmospheric dasher, as it cuts the air-flakes, or bubbles, in its action, and does away with a cream-pump entirely. It is cheap of construction, and can be attached to most any style of dasher. It can be formed to suit the shape of any churn, and fastened on the dasher, the wings, or arms, in any suitable manner.

The sieve may be made of common wire, wire cloth, composed of brass, tinned, or galvanized metal, or, if preferred, of perforated metal, as before stated.

What we claim as our invention, and desire to secure by Letters Patent, is—

The arrangement of the dasher in two clamp-heads, $a\ a,\ b\ b$, which clamp the sieve B between, the construction being such that said sieve may be applied and removed at pleasure, as herein set forth.

In witness whereof, we have hereunto signed our names, in the presence of two subscribing witnesses.

ORVILLE SPERRY.
JOHN W. HOPSON.

Witnesses:
    J. R. DRAKE,
    ALBERT HAIGHT.